United States Patent Office 2,830,186
Patented Apr. 8, 1958

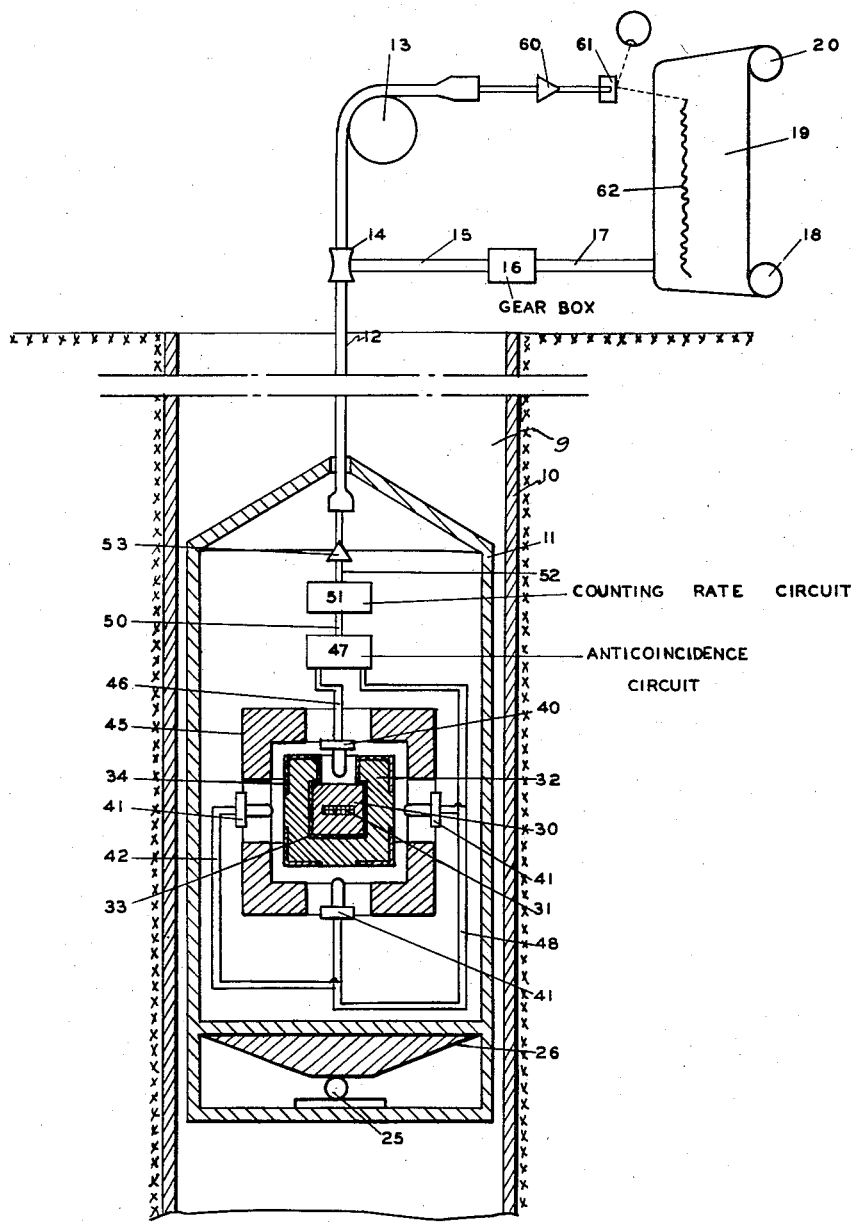
INVENTOR.
Serge A Scherbatskoy

2,830,186

NEUTRON DETECTOR

Serge A. Scherbatskoy, Tulsa, Okla., assignor, by mesne assignments, to PGAC Development Co., Houston, Tex., a corporation of Texas Application January 21, 1954, Serial No. 405,420

9 Claims. (Cl. 250—71)

This invention is concerned with a radiation detector and method and apparatus for performing measurements of neutrons. It is particularly adapted for performing measurements in a bore hole with the use of a neutron source for radiating neutrons into the formations adjoining said bore hole.

The neutrons emitted by said source possess a wide range of energy extending at 10 m. e. v. and they undergo numerous collisions during their passage through the formations. As a result of these collisions the energy of neutrons is gradually degraded and numerous gamma rays are produced in the formation. Thus a detector placed in the bore hole is exposed to heterogeneous radiations comprising a mixture of gamma rays and neutrons, said neutrons covering a wide range of energies extending from about 10 m. e. v. down to thermal values of 0.025 e. v. We shall differentiate hereafter neutrons having energies exceeding 100,000 e. v. which we shall designate as "fast neutrons" from the neutrons comprised within the energy range from 100 e. v. to 100,000 e. v. The latter neutrons shall be designated as "intermediate neutrons."

It is an object of the present invention to detect and measure only intermediate neutrons and thermal neutrons and to eliminate at the detector all other radiations.

It is another object of the present invention to provide an improved method and improved apparatus for determining the character of unknown substances, particularly adjacent a bore hole.

Further objects and advantages of the present invention will become apparent as the following description proceeds, and the features of novelty which characterize the invention will be pointed out with particularity in the claims annexed to and forming part of this specification.

For further details of specifications embodying the principles of this invention and for a more complete understanding of the mode of application of the principles of this invention and the numerous advantages thereof, reference may be had to the accompanying drawing which illustrates diagrammatically a bore hole which penetrates the strata of the earth and the general arrangement for logging the bore hole in accordance with the principles of the present invention.

Referring now to the drawing there is schematically illustrated a drill hole 9 penetrating the formations to be explored. The bore hole is provided in the conventional manner by a tubular metallic casing designated as 10.

For the purpose of exploring the formations along the bore hole, there is provided in accordance with the present invention exploratory apparatus comprising a housing 11 which is lowered into the bore hole 9 by means of a cable 12, preferably including as a part thereof suitable insulated conductors. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 mounted on a shaft 15, and rotation of the reel and consequently of the shaft 15 is transmitted through a gear box 16 to another shaft 17 which is drivingly connected to take up spool 1 for moving a photographic film 19 from a feed spool 20 to take up spool 18.

In the lower portion of the housing 11 there is provided a support on which is disposed a suitable source of neutrons generally designated as 25 such, for example, as a polonium beryllium preparation which may be enclosed in a container made of a suitable material such as glass.

The radiations transmitted from the source 25 tend to propagate themselves in all directions. I have provided, however, an absorbing block 26 formed of materials, for example, such as lead and paraffin which is relatively opaque to penetrating radiations, the paraffin being relatively opaque to neutrons and the lead being relatively opaque to other radiations. I have, therefore, prevented a direct path between the source 25 and the detecting instrument positioned above the block 26. Consequently, the radiations emitted by the source 25 are directed sideways into the adjoining formations and the amount of radiation going upwards through the absorbing block is negligible.

The radiation detector located above the shield 26 is of scintillation counter type and comprises crystals such as anthracene in combination with photomultipliers. The crystals are adapted to convert the incoming gamma rays and neutrons into impulses of light which subsequently impinge upon the corresponding photomultipliers provided with suitable voltage supplies. We obtain thus across the output terminals of such photomultipliers current impulses which coincide with the arrival of gamma rays. More particularly, the detector comprises anthracene crystal 30 provided in its center with a thin layer of boron 31, said crystal being surrounded by a relatively larger anthracene crystal 32. The crystal 30 has its outside surface covered with an aluminum reflector 33, whereas the crystal 32 has its inside surface covered with aluminum reflector 33 and outside surface covered with aluminum reflector 34. The light flashes produced in the crystal 30 are adapted to be transmitted by means of the reflector 33 to a photomultiplier provided with a suitable voltage supply, the combined photomultiplier and voltage supply being designated as 40. Similarly, the light flashes produced in the crystal 32 are adapted to be transmitted by means of reflectors 33, 34 to one or more photomultipliers 41 (provided with voltage supplies), said photomultipliers 41 being connected in parallel.

The crystals 30 and 32 are optically separated one from the other by the aluminum layer 33. Thus a light flash in the crystal 30 does not affect any of the photomultipliers 41 and a light flash in the crystal 32 does not affect the photomultiplier 40.

The detector is surrounded by a tungsten shield 45, the purpose of which is to shield the detector from soft gamma rays and X-rays.

The output of the photomultiplier 40 is connected through leads 46 to one of the input channels of an anticoincidence circuit 47, the other input channel of said circuit being connected to the output of the photomultiplier 41 through leads 48. The anticoincidence circuit is adapted to produce a current pulse across its output leads 50 whenever a pulse is produced in the output of the photomultiplier 40, but there is no simultaneous pulse in the output of any of the photomultipliers 41. Anticoincidence circuits are well known in the art and for their description see, for instance, E. Segre, "Experimental Nuclear Physics," John Wiley & Sons, New York, N. Y., 1953, pp. 104–108.

The output leads 50 are applied to a counting rate circuit 51. Thus we obtain across the output leads 52 of the circuit 51 a D. C. voltage having magnitude representing the frequency of impulses produced by the anticoincidence circuit. The leads 52 are in turn applied through an amplifier 53 to the cable 12.

It is well known that anthracene crystals such as 30 and 32 respond not only to light particles such as electrons, but also to heavy particles such as protons and alpha rays. However, the efficiency of the detector decreases with the increase of the mass of the particle. Thus the light impulses and consequently the electrical impulses resulting from these three radiations are substantially in the ratio 9:2:1, i. e. the impulse caused by an electron is about 9 times larger than the impulse caused by an alpha particle of the same energy.

We shall consider now in particular the interaction of the incoming radiation with the crystal 30. It is well known that neutron and gamma rays do not interact directly with the crystal 30 and the interaction process is different for thermal neutrons, fast neutrons, and gamma rays. Furthermore, the gamma rays interact with the crystal in three different ways: by photoelectric effect, Compton effect, and pair formation. We shall separately consider each of these interaction processes.

An incoming thermal neutron interacts with the boron layer 31 causing emission into the crystal 30 of an alpha particle of an energy approximately 2.5 m. e. v. The alpha particle slows down in the crystal 30 producing ionization and excitation of the surrounding atoms, thus causing a flash of light in the crystal 30 and a corresponding current impulse in the photomultiplier 40. The energy of the alpha particle has been absorbed completely in the crystal 30 and there is no simultaneous occurrence of a pulse in any of the photomultipliers 41. The anticoincidence circuit always responds to pulse from the photomultiplier 40 when it is not accompanied by a simultaneous pulse from any of the photomultipliers 41 and consequently, whenever a thermal neutron interacts with the detector we obtain a pulse across the output leads of the circuit 47.

An incoming fast neutron strikes one of the atoms of the crystal 30 such as hydrogen, in which case the nucleus of hydrogen recoils as proton, thus producing a pulse of light in the crystal 30, said light producing in turn a current impulse in the output of the photomultiplier 40. The incoming neutron is in turn scattered by the crystal 30 and the scattered neutron escapes from the crystal 30 and interacts with the crystal 32. If the incoming neutron is fast, i. e. if its energy is relatively large and exceeds 100,000 e. v., then the scattered neutron produces in the crystal 32 a relatively large light pulse which in turn causes a relatively large impulse to appear in the photomultiplier. If, however, the incoming neutron is intermediate, i. e. if its energy is below 100,000 e. v. the scattered neutron interacting with the crystal 32 produces a small light pulse which is not detectable by the photomultiplier 41 since it is below its noise level. Consequently, in case of a neutron of relatively large energy there is a simultaneous appearance of pulses in the photomultipliers 40 and 41. When, however, the energy of the neutron is small we obtain a pulse in the photomultiplier 40 only. Since the anticoincidence circuit does not respond to simultaneous impulses, the detector is not responsive to fast neutrons, but is responsive to intermediate neutrons.

Consider now the interaction of gamma rays with the crystal, and particularly the photoelectric interaction, Compton interaction, and pair formation.

The number of photoelectric interactions in the crystal 30 is negligible since anthracene is comprised of atoms of low atomic number and because of the effect of the shield 45 which absorbed most of low energy gamma rays and X-rays.

In the Compton interaction, the incoming photon is scattered by one of the electrons of the crystal 30. As a result of such scattering the electron has acquired kinetic energy, thus producing a pulse of light in the crystal 30, said light producing in turn a current impulse in the output of the photomultiplier 40. The scattered photon usually escapes from the crystal 30 and interacts with the crystal 32. As a result of such interaction we obtain in the crystal 32 a flash of light which in turn produces a current pulse in at least one of the photomultipliers 41. Consequently, the Compton effect is characterized by a simultaneous occurrence of pulses in the photomultipliers 40 and 41. Since the anticoincidence circuit 47 does not respond to simultaneous impulses, the detector is not responsive to gamma rays undergoing the Compton effect.

In the process of pair formation, the incoming photon vanishes completely and a positron electron pair is created in the crystal 30. Both the electron and the positron slow down producing ionization and excitation of surrounding atoms, thus causing a flash of light in the crystal 30 and a corresponding current impulse in the output of the photomultiplier 40. After the positron has been reduced in energy it makes a unique and final interaction with an orbital electron. In this interaction the pair of positive and negative electrons unite and annihilate themselves in the formation of two photons that are ejected in opposite direction. These photons designated as annihilation quanta interact with the crystal 32 and produce an impulse in the output and at least one of the photomultipliers 41 which is coincident with the impulse in the output of the photomultiplier 40. Since the anticoincidence circuit 47 does not respond to simultaneous impulses, the detector is not responsive to gamma rays undergoing the pair formation.

Since the occurrence of photoelectric effect is very infrequent, it can be assumed that Compton effect and pair formation are the only interactions that take place. Consequently the detector does not respond neither to gamma radiation nor to fast neutrons. However, whenever an intermediate neutron or a thermal neutron interacts with the detector we obtain a pulse across the leads 50 and therefore the output voltage of the counting rate circuit 51 represents the number of thermal neutrons and intermediate neutrons intercepted per second by the crystal 30. This voltage is transmitted through the amplifier 53, cable 12, amplifier 60 to the galvanometer coil 61 and produces in a manner well known in the art a trace 62 upon the photosensitive film 19, said trace representing the number of incoming thermal neutrons and intermediate neutrons detected per second at various depths in the hole.

It will be obvious to those skilled in the art that numerous modifications other than those herein disclosed can be made without departing from the scope or spirit of this invention.

I claim:

1. In a neutron detecting system, a detector sensitive to thermal neutrons, fast neutrons and gamma rays and adapted to produce a current impulse in response to a thermal neutron, fast neutron, or a gamma ray, another detector surrounding said first detector, said other detector being selectively responsive to gamma rays and fast neutrons and irresponsive to thermal neutrons and adapted to produce a current impulse in response to a gamma ray or a fast neutron, an anticoincidence network connected to said two detectors for providing an output signal at the occurrence of an impulse at said first detector that is not simultaneous with an impulse at said second detector.

2. In a neutron detecting system a detector sensitive to thermal neutrons, fast neutrons, and gamma rays, and adapted to produce a current impulse in response to a thermal neutron, fast neutron, or a gamma ray, another detector surrounding said first detector, said other detector being selectively responsive to gamma rays and fast neutrons and irresponsive to thermal neutrons and adapted to produce a current impulse in response to a gamma ray or a fast neutron, an anticoincidence network connected to said two detectors for providing an output signal at the occurrence of an impulse at said first detector that is not simultaneous with an impulse at said second detector, and a shield comprising an element of a high atomic number surrounding said detectors.

3. In a neutron detecting system, a detector sensitive to thermal neutrons, fast neutrons and gamma rays and adapted to produce a current impulse in response to a thermal neutron, fast neutron or a gamma ray, another detector surrounding said first detector, said other detector being selectively responsive to gamma rays and fast neutrons and irresponsive to thermal neutrons, and adapted to produce a current impulse in response to a gamma ray or a fast neutron, an anticoincidence network connected to said two detectors for providing an output signal at the occurrence of an impulse at said first detector that is not simultaneous with an impulse at said second detector, a counting rate circuit connected to said anticoincidence network for providing a voltage representing the occurrence of its output signals, and means for indicating said voltage.

4. A neutron detector, comprising a crystal sensitive to thermal neutrons, fast neutrons, and gamma rays, and adaped to produce a light impulse in response to a thermal neutron, fast neutron, or a gamma ray, another crystal surrounding said first crystal, said other crystal being selectively sensitive to gamma rays and fast neutrons and insensitive to thermal neutrons and adapted to produce a light impulse in response to a gamma ray or a fast neutron, a first photomultiplier responsive to a light impulse in said first crystal to produce a corresponding current impulse, a second photomultiplier responsive to a light impulse in said second crystal to produce a corresponding current impulse, an anticoincidence network connected to said two photomultipliers for providing an output signal at the occurrence of an impulse at said first photomultiplier that is not simultaneous with an impulse at said second photomultiplier, a counting rate circuit connected to said anticoincidence network for providing a voltage representing the occurrence of its output signals, and means for indicating said voltage.

5. A neutron detector, comprising a crystal sensitive to thermal neutrons, fast neutrons, and gamma rays and adapted to produce a light impulse in response to a thermal neutron, fast neutron, or a gamma ray, another crystal surrounding said first crystal, said other crystal being selectively sensitive to gamma rays and fast neutrons and insensitive to thermal neutrons and adapted to produce a light impulse in response to a gamma ray or a fast neutron, a first photomultiplier responsive to a light impulse in said first crystal to produce a corresponding current impulse, a second photomultiplier responsive to a light impulse, a second photomultiplier responsive to a light impulse in said second crystal to produce a corresponding current impulse, an anticoincidence network connected to said two photomultipliers for providing an output signal at the occurrence of an impulse at said first photomultiplier that is not simultaneous with an impulse at said second photomultiplier, and means for indicating the output of said anticoincidence network.

6. In an apparatus for radiological logging of bore holes, a housing adapted to be lowered into a bore hole, said housing comprising a source of neutrons arranged to radiate neutrons into the formations surrounding said hole whereby gamma rays and neutrons are directed towards said hole as a result of interaction of said neutrons with said formation, a crystal conveniently distant from said source, said crystal being sensitive to thermal neutrons, fast neutrons, and gamma rays and adapted to produce a light impulse in response to a thermal neutron, fast neutron, or to a gamma ray, another crystal surrounding said first crystal, said other crystal being selectively sensitive to gamma rays and fast neutrons and adapted to produce a light impulse in response to a gamma ray or a fast neutron, a first photomultiplier responsive to a light impulse in said first crystal to produce a corresponding current impulse, a second photomultiplier responsive to a light impulse in said second crystal to produce a corresponding current impulse, an anticoincidence network connected to said two photomultipliers for providing an output signal at the occurrence of an impulse at said first photomultiplier that is not simultaneous with an impulse at said second photomultiplier, a counting rate circuit connected to said anticoincidence network for providing a voltage representing the rate of occurrence of its output signals, means for determining the depth to which said housing is lowered, and means for separately recording the outputs of said circuits in correlation with depth.

7. In an apparatus for radiological logging of bore holes, a housing adapted to be lowered into a bore hole, said housing comprising a source of neutrons arranged to radiate neutrons into the formations surrounding said bore hole whereby gamma rays and neutrons are directed towards said bore hole as a result of interaction of said neutrons with said formations, a detector conveniently distant from said source, said detector being sensitive to thermal neutrons, fast neutrons, and gamma rays, and adapted to produce an impulse in response to a thermal neutron, fast neutron, or to a gamma ray, another detector surrounding said first detector, said other detector being selectively sensitive to gamma rays and fast neutrons, and adapted to produce an impulse in response to a gamma ray or fast neutron, an anticoincidence network connected to said two detectors for providing an output signal at the occurrence of an impulse at said first detector that is not simultaneous with an impulse at said second detector, a counting rate circuit connected to said anticoincidence network for providing a voltage representing the rate of occurrence of its output signals, means for determining the depth to which said housing is lowered and means for recording the outputs of said circuit in correlation with depth.

8. In a system for detecting neutrons of intermediate and thermal energy levels in the presence of fast-neutron and gamma-ray fields, a first detector comprising an anthracene crystal, a thin layer of boron associated therewith, and a photomultiplier for generating current impulses responsively to light flashes in said crystal, a second detector surrounding said first detector, said second detector being selectively sensitive to gamma rays and fast neutrons and comprising a second anthracene crystal and photomultiplier means therefor operative to generate current impulses responsively to light flashes in said second crystal, an anticoincidence network fed by said two photomultipliers for providing output pulses responsively to the occurrence of a current impulse from said first photomultiplier that is not simultaneous with a current impulse from said second photomultiplier, a counting-rate circuit connected to said anticoincidence network for providing an output voltage representing the rate of occurrence of its output pulses, and means for indicating said voltage.

9. In an apparatus for radiological logging of bore holes, a housing adapted to be lowered into a bore hole, said housing comprising a source of neutrons arranged to radiate neutrons into the formations surrounding said bore hole whereby gamma rays and neutrons are directed toward said bore hole as a result of interaction of said neutrons with said formations, a first detector comprising an anthracene crystal, a thin layer of boron associated therewith, and photomultiplier means operative to generate current impulses responsively to light flashes in said crystal, a second detector surrounding said first detector, said second detector being selectively responsive to gamma rays and fast neutrons and comprising a second anthracene crystal and photomultiplier means therefor operative to generate current impulses responsively to light flashes in said second crystal, shielding means disposed between said neutron source and said detectors operative to shield said detectors from direct radiation from said neutron source, an anticoincidence network fed by said two photomultipliers for providing an output signal responsively to occurrence of a current impulse from the first photomultiplier that is not simultaneous with a current impulse from said second photomultiplier, a counting-rate circuit connected to said anticoincidence network for providing a voltage representing the rate of occurrence of its output signals, means for determining the depth of said housing, and means for recording said voltage as a function of depth.

References Cited in the file of this patent

UNITED STATES PATENTS

| | | |
|---|---|---|
| 2,648,012 | Scherbatskoy | Aug. 4, 1953 |
| 2,659,011 | Youmans et al. | Nov. 10, 1953 |

OTHER REFERENCES

Two-Crystal Gamma-Ray Scintillation Spectrometer by R. E. Connally from The Review of Scientific Instruments, vol. 24, No. 6, June 1953, pp. 458, 459.